United States Patent [19]

Appel et al.

[11] Patent Number: 5,264,869
[45] Date of Patent: Nov. 23, 1993

[54] ELECTRO-OPTICAL CONTROL APPARATUS AND SYSTEM FOR SPOT POSITION CONTROL IN AN OPTICAL OUTPUT DEVICE

[75] Inventors: James J. Appel, Brighton, N.Y.; Thomas L. Paoli, Los Altos, Calif.

[73] Assignee: Xerox Corporation, Stamford, Conn.

[21] Appl. No.: 747,039

[22] Filed: Aug. 19, 1991

[51] Int. Cl.$^5$ .............................. B01D 15/16
[52] U.S. Cl. .................................... 346/108
[58] Field of Search ............ 346/108, 107 R, 76 L, 346/160

[56] References Cited

U.S. PATENT DOCUMENTS

| | | | |
|---|---|---|---|
| 3,636,838 | 1/1972 | Chang et al. | 95/4.5 |
| 4,040,096 | 8/1977 | Starkweather | 358/302 |
| 4,600,837 | 7/1986 | DiStefano et al. | 250/235 |
| 4,647,158 | 3/1987 | Yeadon | 359/305 |
| 4,651,169 | 3/1987 | Muka | 346/108 |
| 4,651,170 | 3/1987 | Chandler et al. | 346/108 |
| 4,755,036 | 7/1988 | Suzuki et al. | 385/8 |

FOREIGN PATENT DOCUMENTS 57-89719  6/1982  Japan.
2-50021  10/1990  Japan.

OTHER PUBLICATIONS

Bestenreiner, F., U. Greis, J. Helmberger, and K. Stadler, *Visibility and Correction of Periodic Interference Structures in Line-by-Line Recorded Images*, Journal of Applied Photographic Engineering, 2:2, Spring 1976, pp. 86–92.

Filinski, I. and T. Skettrup, *Fast Dispersive Beam Deflectors and Modulators*, IEEE Journal of Quantum Electronics, QE-18:7, Jul. 1982, pp. 1059–1062.

Urbach, John C., Tibor S. Fisli, and Gary K. Starkweather, *Laser Scanning for Electronic Printing*, Proceedings of the IEEE, 70:6, Jun. 1982, pp. 597–618.

Sprague, Robert A., John C. Urbach, and Tibor S. Fisli, *Advances in Laser and E-O Printing Technology*, Laser Focus/Electro-Optics, Oct. 1983, pp. 101–109.

Born, Max, and Emil Wolf, et al., Principles of Optics, 5th Ed., 1975, Pergamon Press, New York, pp. 177–180; and pp. 405–407.

Kaminow, Ivan P., *Measurements of the Electrooptic Effect in CdS, ZnTe, and GaAs at 10.6 Microns*, IEEE Journal of Quantum Electronics, QE-4:1, Jan. 1968, pp. 23–26.

Houghton, A. J. N., P. M. Rodgers and D. A. Andrews, *High-Performance GaAs-GaAlAs Phase Modulators for PSK Optical Fibre Systems*, Electronics Letters, May 24, 1984, 20:11, pp. 479–481.

Simes, R. J., R. H. Yan, R. S. Geels, L. A. Coldren, J. H. English, A. C. Gossard, and D. G. Lishan, *Electrically Tunable Fabry-Perot Mirror Using Multiple Quantum Well Index Modulation*, Applied Physics Letters, 53:8, Aug. 22, 1988, pp. 637–639.

Primary Examiner—Mark J. Reinhart
Attorney, Agent, or Firm—Jonathan A. Small; John M. Kelly

[57] ABSTRACT

Spot registration or position in an optical output device, such as a raster output scanner (ROS), may be controlled in a slow, or process, scan direction by interposing in the image path an electro-optic element whose angular dispersion varies for a given wavelength as a function of the electrical bias applied to it. By orienting the electro-optic element such that dispersion control is perpendicular to the fast or line scan direction of the ROS, varying the electrical bias applied to it varies the dispersion in the slow scan direction. The electro-optic element may be, for example, a prism of AlGaAs. Bias applied to the electro-optic element may be in response to the output of a means for detecting and quantifying such positional errors and/or in response to predetermined correction information output from a processor controlled memory unit or the like. Spot position for single or multiple beam optical output devices may be achieved.

26 Claims, 7 Drawing Sheets

ELECTRO-OPTICAL CONTROL APPARATUS AND SYSTEM FOR SPOT POSITION CONTROL IN AN OPTICAL OUTPUT DEVICE

BACKGROUND OF THE INVENTION

The present invention relates generally to optical output devices, and more specifically to a device providing position or registration control of a spot or spots at which a light beam strikes a photoreceptive element which includes an electro-optic element located in the light beam's path which has a controllable and variable index of refraction, diffraction, etc.

The present application relates to concurrently filed U.S. Pat. Ser. Nos. 5,212,381; 5,204,523; 5,208,456, which each are assigned to the assignee hereof. Each of these applications are incorporated by reference thereto.

Although applicable to a wide variety of optical output devices, the present invention finds particular utility in Raster Output Scanning (ROS) apparatus. Therefore, the following details and description being with a background of the present invention in terms of ROS apparatus. ROS has become the predominant method for imparting modulated light information onto the photoreceptor in printing apparatus used, for example, in digital printing, and has found some application in other image forming operations such as writing to a display, to photographic film, etc. Consider, for illustration purposes, what is perhaps the most common application of ROS, digital printing. As is known, the scanning aspect thereof is conventionally carried out by a moving reflective surface, which is typically a multifaceted polygon with one or more facets being mirrors. The polygon is rotated about an axis while an intensity-modulated light beam, typically laser light, is brought to bear on the rotating polygon at a predetermined angle. The light beam is reflected by a facet and thereafter focussed to a "spot" on a photosensitive recording medium. The rotation of the polygon causes the spot to scan linearly across the photosensitive medium in a fast scan (i.e., line scan) direction. Meanwhile, the photosensitive medium is advanced relatively more slowly than the rate of the fast scan is a slow scan direction which is orthogonal to the fast scan direction. In this way, the beam scans the recording medium in a raster scanning pattern. The light beam is intensity-modulated in accordance with a serial data stream at a rate such that individual picture elements ("pixels") of the image represented by the data stream are exposed on the photosensitive medium to form a latent image, which is then transferred to an appropriate receiving medium such as sheet paper.

Although, for the purpose of example, this discussion is in terms of ROS apparatus, it will become apparent from the following discussion that there exists many other scanning and non-scanning system embodiments of the present invention. However, as a convention, the word "scan" will be used when referring to the fast and slow scan directions (i.e., motion or position in the fast and slow scan planes), with the understanding that actual scanning of the spot is not absolutely required.

Data in each of the fast and slow directions is generally sampled. The sampling rate of the slow scan direction data equates to 300 lines per inch or more in many printing apparatus. It has been shown that errors in the slow scan direction of as small as 1% of the nominal line spacing may be perceived in a half tone or continuous tone image. This implies a need for a high degree of spot position control in the slow scan direction on the image plane, especially in such applications as multiple beam and multiple ROS color printers where control of the position of multiple spots is critical. Furthermore, high resolution printing, on the order of 600 spots per inch or higher demands very accurate spot positioning.

Errors of the spot position in the slow scan direction arise from many sources, including polygon and/or photosensitive medium motion flaws, facet and/or image plane (e.g., photosensitive medium) surface defects, etc. These errors are most commonly addressed by passive or active in-line optics. Positional errors which extend over an entire scan line are most commonly compensated for by retarding or advancing the start of scan by one or more scan lines (this correction being limited to whole multiples of a scan line spacing). See, for example, *Advances in Laser and E-O Printing Technology*, Sprague et al., Laser Focus/Electro-Optics, pp. 101–109, October 1983. Another approach employing passive optics is the use of extremely high quality optical and mechanical elements. This necessarily implies higher overall costs, and possible limitations on the durability of the system. Still another example of passive optical correction is the system disclosed in U.S. Pat. No. 4,040,096, issued Aug. 2, 1977 to Starkweather, which accommodates a basic polygon ROS structure having runout and/or facet errors (both scanning errors in the slow scan direction) by locating a first cylindrical lens in the pre-polygon optical path, which focuses the beam in the slow scan direction onto the facet, and a second cylindrical lens in the post-polygon path, which focuses the facet onto the desired image plane. Toroidal elements and concave mirrors have also been used to accomplish the same function.

Active compensation for process scan direction errors usually involves a closed loop and/or memory-fed compensation system. A closed loop acousto-optical (A-O) compensation system is discussed in *Laser Scanning for Electronic Printing*, Urbach et al., Proceedings of the IEEE, vol. 70, No. 6, June 1982, page 612, and the reference cited therein. As discussed in this reference, a slow scan spot position detector is placed in the scan line which, together with related processing apparatus, is capable of quantifying the slow scan displacement. An A-O element is disposed in the optical path whose refractive index may be varied by establishing therein an acoustic wave. A variation in the acoustic wave generated in the A-O element is accompanied by a variation in the dispersion angle (that is, the angle of the output beam relative to the angle of the input beam). The slow scan displacement information from the detector and processing apparatus is fed to the acoustic wave generating portion of the A-O device, which may then control the slow scan direction position of the scan line in response to the displacement information. Further, the control information for certain recurrent displacement errors may be measured in advance and synchronized with the angular motion of the rotating polygon, as discussed in the above reference. See also *Visibility and Correction of Periodic Interference Structures in Line-by-Line Recorded Images*, J. Appl. Phot. Eng., vol. 2, pp. 86–92, Spring 1976.

One technology which, although it is directed to a method of scanning, as opposed to addressing slow scan direction errors, is nonetheless relevant is disclosed in *Fast Dispersive Beam Deflectors and Modulators*, Filinski and Skettrup, IEEE Journal of Quantum Electronics, vol. QE-18, no. 7, pp. 1059–1062, July 1982. As briefly described therein, a static optical element having dispersion characteristics which vary as a function of the wavelength of the incident light can be utilized to scan in one dimension by varying the output wavelength of the light source. Various types of static dispersive elements are mentioned therein including prisms and gratings, although no details about incorporation of this type of scanning element into a complete scanning system are provided. Nor is there any mention in that reference about employing the described apparatus to control slow scan direction spot position.

There is presently a need in the art for spot position control apparatus and methods which provide improved continuous, very high resolution deflection of an optical beam in the slow scan direction.

Shortcomings of spot position control schemes known in the art include the complexity, cost and/or the difficulty of manufacture of such systems. For example, the use of high quality optics requires not only high quality optical elements, but utmost control in the positioning of those optics in order to obtain the requisite very precise mechanical control sufficient to adjust spot position 0.02 mm or less, required in many cases. In order to achieve this level of spot position control with the aforementioned acousto-optic modulators, an acoustic wave must be established and maintained with great precision. These acousto-optic modulators are relatively quite expensive, and require an associated accurate high frequency signal generator and related electronics to produce and maintain the acoustic waves.

Two further disadvantages of many prior art spot position control schemes are the speed and precision at which they are capable of operating. For example, three of the most common ROS schemes, cylinder lenses, rotating mirrors, and translating roof mirrors are generally too slow to correct for motion quality errors or line-to-line errors, while rotating mirrors and translating roof mirrors are also large and therefore difficult to move precisely and quickly.

SUMMARY OF THE INVENTION

The present invention provides a novel apparatus for controlling the spot position or registration in the slow scan direction in an optical output system which overcomes a number of problems and shortcomings of the prior art. Spot position refers to the location that a light beam is incident upon an image plane, and spot registration refers to the location that the light beam is incident on that image plane relative to other spot positions (for example in overwriting a spot for tone, position, color, or control of other parameters). However, for simplicity of explanation, any reference to control of spot position will include control of spot registration, unless otherwise noted. In general, the spot position control is provided by interposing in the image path an electro-optic element whose angular dispersion varies for a given wavelength as a function of the electrical bias applied to it. Spot position control is achieved by controlling the electrical bias applied to the electro-optic element. Spot position control may be achieved for either a single spot or for multiple spots where the position of each spot relative to the other spots is maintained. Depending on the output parameters of the optical output apparatus embodying the present invention, spot position control may be achieved on a pixel-by-pixel basis.

One embodiment of the present invention is a ROS apparatus of the type including a light source, typically a laser light source, for emitting a light beam, means for modulating the light beam in accordance with a data signal, means for scanning the light beam in a raster fashion, and image plane means, such as a photoreceptive element, for receiving the scanned light beam. Further included is an electro-optic means for controlling the position in the slow scan plane of the light beam at the point that it is incident upon the image plane means, disposed in the optical path between the light source and the image plane means. Means for determining the existence and extent of spot position errors and/or the need for application of predetermined spot position correction may also be included.

In operation, a light beam is generated by the light source which is modulated in response to an image data signal. The light beam is scanned across at least a portion of a surface of the image plane means in a fast scan plane, as well as scanned across at least a portion of a surface of the image plane means in a slow scan plane which is normal to the fast scan plane. The existence and extent of error, if any, in the position of the light beam in the slow scan plane is determined for a part or all of the scan in the fast scan plane, and correction for any slow scan plane error is performed by varying the optical properties, specifically the index of refraction, of the electro-optic element through which the light beam passes by varying its electrical state (or optical properties) in response to the determination of the existence and extent of such error.

The control of spot position on the image plane means provided by the present invention may be employed to correct for inter-line slow scan plane positional errors by varying the electrical bias applied to the electro-optic element in response to the output of a means for detecting and quantifying such positional errors and/or in response to predetermined correction information output from a processor controlled memory unit or the like.

Furthermore, the maximum amount of slow scan plane spot position correction that will be required will be equal to one half of a scan line height. Any greater amount of correction may be realized through a combination of the above spot position control and retardation or advancement of one scan line.

The scope of the present invention and the manner in which it addresses the problems associated with prior art methods and apparatus will become more readily apparent from the following detailed description when taken in conjunction with the accompanying drawings and claims.

BRIEF DESCRIPTION OF THE DRAWINGS

In general, like reference numerals will be used to denote like elements as between each of the aforementioned figures.

DETAILED DESCRIPTION

Figures 1, 1A, 2:
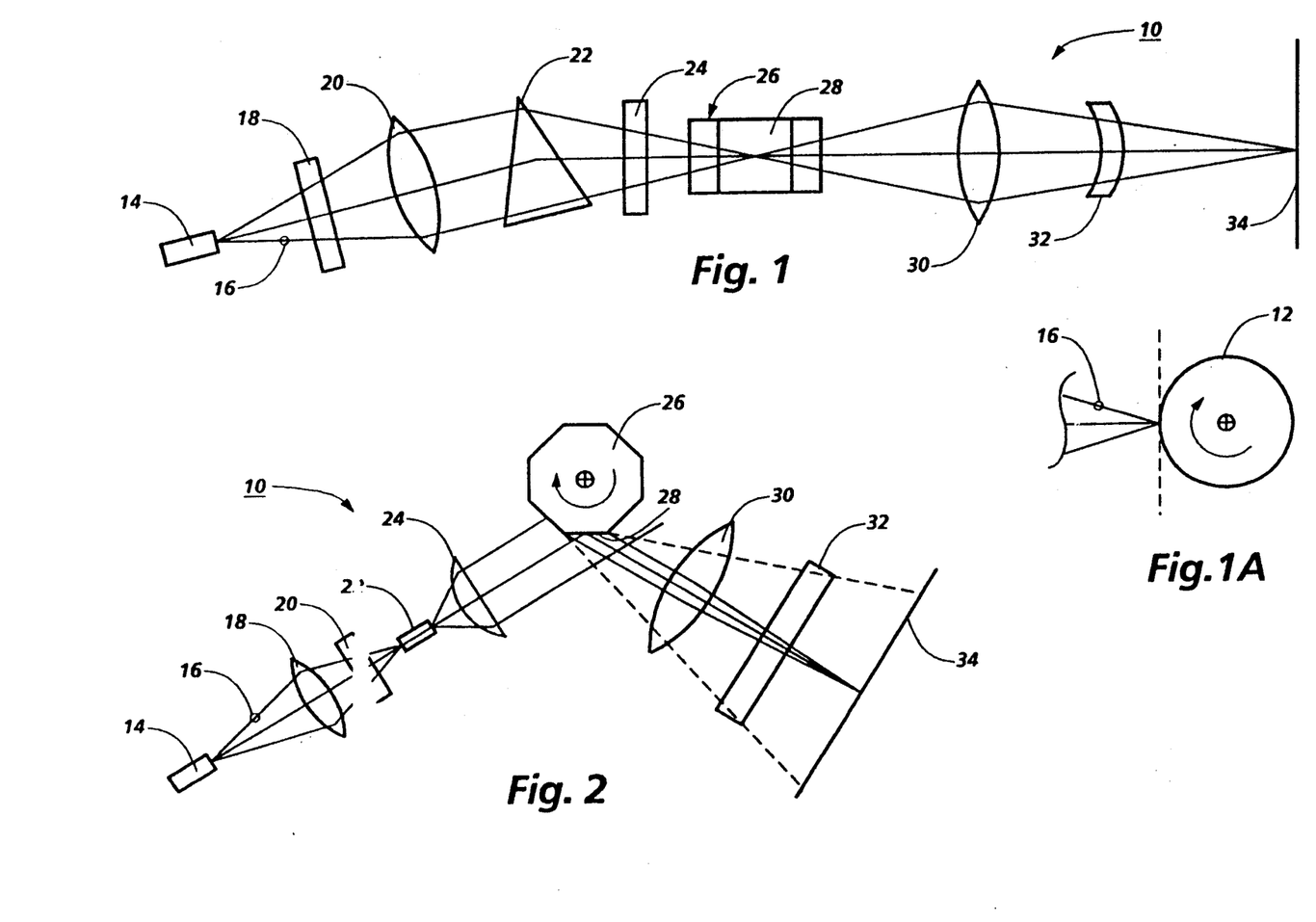
FIG. 1 shows a side or elevation view of the general optical configuration of an apparatus according to one embodiment of the present invention, showing an electro-optic element in the form of a prism disposed between the light source and the rotation polygon scanning device of a ROS system.
FIG. 1A shows a photoreceptive drum at the image plane of the apparatus of FIG. 1 as might be employed in a xerographic printing application of the present invention.
FIG. 2 shows a top or plan view of the general optical configuration of the apparatus of FIG. 1, showing an electro-optic element disposed between the light source and the rotating polygon scanning device of a ROS system.

A detailed description of a first embodiment of the present invention is presented herein with reference to FIGS. 1 and 2, which show, respectively, slow scan plane and fast scan plane views of a scanning apparatus 10. Apparatus 10 is a raster output scanning device of the type which may, for example, output a scanned and modulated output signal to a photoreceptive drum 12, such as that shown in FIG. 1A, for use in a xerographic printing process. Alternatively, apparatus 10 may output a scanned and modulated optical signal to a display device, photographic device or other application employing such a scanned and modulated optical signal.

Apparatus 10 includes a light source 14, such as a solid state laser or array of lasers, which produces a diverging beam of coherent light 16. In the path of beam 16 are first cylindrical lens 18, which has power in the fast scan plane only, second cylindrical lens 20, which has power only in the slow scan plane, electro-optical device 22, which is described in further detail below, third cylindrical lens 24, which has power only in the fast scan plane, scanning device 26, which is shown as a rotating polygon having at least one reflective facet 28 (but which may also be a rotating hologram, rotating diffraction grating, etc.), spherical lens 30, which has power in both the fast and slow scan planes, and toroidal lens 32. The path of beam 16 terminates at image plane 34, which may be a line on the aforementioned rotating photoreceptive drum 12 (FIG. 1A), a surface of a ground glass or other type of display screen, a photosensitive film, etc.

Referring to FIG. 2, which shows the fast scan plane view of apparatus 10, the diverging beam of light 16 emitted by source 14 is focused by first cylindrical lens 18 onto the entrance aperture of electro-optic device 22, through cylindrical lens 20. The electro-optic device 22 is very narrow in the fast scan plane, causing it to behave as a one dimensional optical waveguide. (See FIG. 3 and the accompanying description below.) Because the electro-optic device 22 behaves as a one dimensional optical waveguide in the scan direction, the light focussed on its entrance aperture, propagates through it, and diverges as it leaves its exit aperture. Cylindrical lens 24 then collimates the light in the scan plane prior to its arrival at facet 28 of scanning device 26.

The electro-optic device 22 is shown in the apparatus of FIGS. 1 and 2 as a prism. However, electro-optic device 22 may be one of a variety of devices and material compositions discussed in greater detail below.

Although modulation of the beam may be conveniently achieved by directly modulating the output of the light source, for example by modulating the current applied to the laser itself from below to above the lasing threshold, as known in the art, the beam may be projected to a modulator (not shown) which may be one of any number of types of modulators, such as an electro-optic or acousto-optic modulator, TIR modulator, etc.

The beam is next incident upon a scanning device 26, which may be one of a variety of such devices known in the art, most typically a rotating polygon with at least one mirrored facet 28. Other suitable devices for scanning include rotating holograms, and rotating diffraction gratings, etc. As shown most clearly in FIG. 2, the rotation of the mirrored facet(s) causes the beam to be deflected and thereby scanned across an image plane 34.

Beam 16, having been appropriately deflected (i.e., reflected) by scanning device 26, diverges, and lenses 30 and 32 are employed to refocus the beam to a circular or elliptical cross-section onto image plane 34, and to correct for scan nonlinearity (f-theta correction). Toroidal lens 32, or an equivalent thereto (such as a cylindrical mirror) corrects for wobble (scanner motion or facet errors). Image plane 34 may be ground glass, a viewing screen, a photosensitive material (film, electrostatic photoreceptor, etc.), or other image plane viewing or receiving medium. FIG. 1A shows the image plane 34 as a line on a rotating photoreceptive drum 12 used in printing applications such as xerographic printing and the like.

Thus, if polygon 20 is rotated in a clockwise fashion, as shown in FIG. 2, a beam reflected from one of its moving facets will be caused to scan across the image plane 34, as indicated by the arrow. If the beam may then be controllably modulated, a scanned and modulated single beam of general application results. If image plane 34 comprises the line on rotating photoreceptive drum 12 of FIG. 1A, and the rotation of drum 12 and the modulation and scanning of the beam are properly coordinated, a ROS printer device may be realized.

Figure 3:
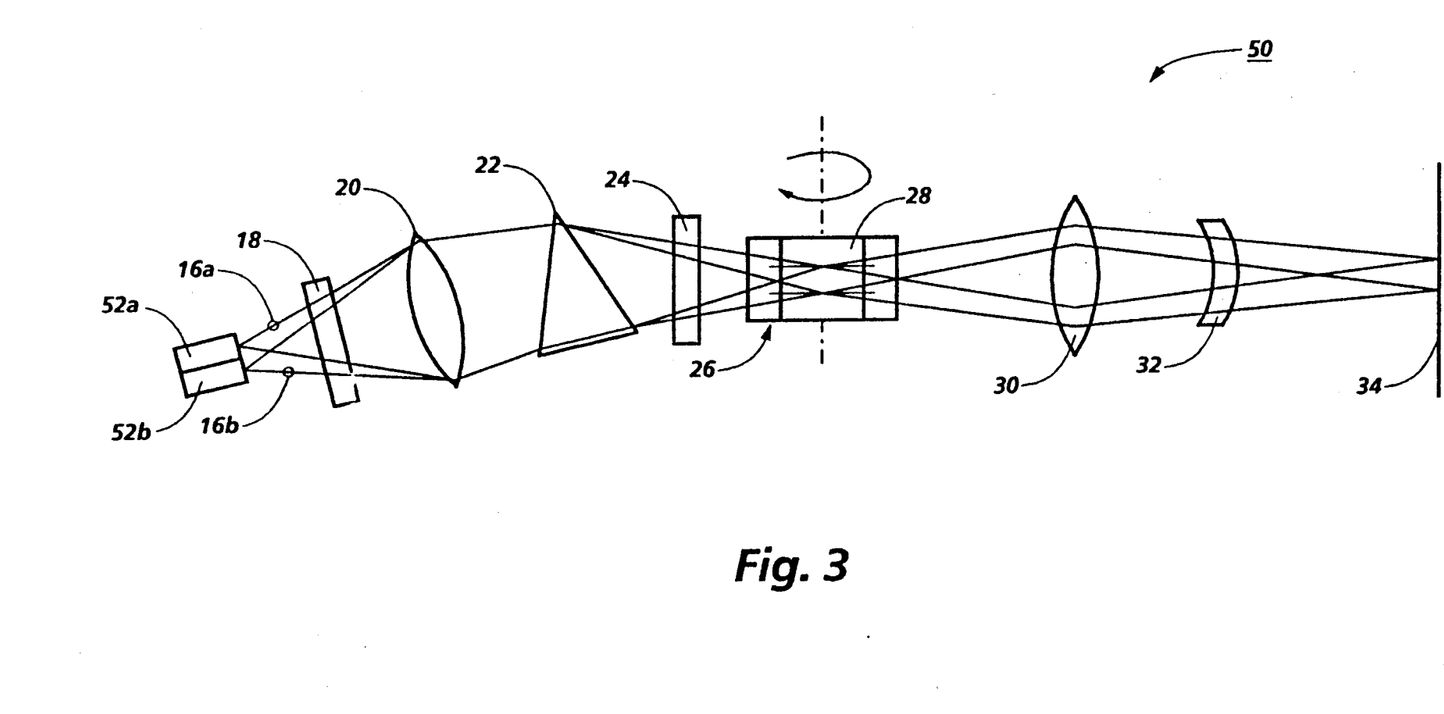
FIG. 3 shows a side or elevation view of the general optical configuration of another embodiment of the present invention, showing an electro-optic element disposed between a multiple-beam light source and a rotating polygon scanning device of a multiple beam ROS system.

An embodiment of the present invention allowing simultaneous spot position control for a plurality of spots is shown in FIG. 3. Apparatus 50 includes multiple light sources 52a, 52b, such as independent solid state lasers, or a monolithic multiple beam solid state laser, which produce diverging beams of coherent light. The wavelengths of the beams will be nearly the same, or the order of a few nm apart, in order that their positions relative to one another do not change during the spot positioning process. As viewed in the fast scan plane, the beams 16a and 16b pass through first cylindrical lens 18, second cylinder lens 20, electro-optic device 22, and third cylindrical lens 24, are reflected off facet 28, and pass through spherical lens 30 and toroidal lens 32 prior to striking image plane 34, as previously described. Although modulation of the beams may be conveniently achieved by directly modulating the output of each light source, for example by modulating the current applied to the laser itself from below to above the lasing threshold, the beams may be projected to a modulator (not shown), which may be one of any number of types of modulators, such as an electro-optic or acousto-optic modulator, TIR modulator, etc. As before, image plane 34 may be ground glass, a viewing screen, a photosensitive material (film, electrostatic photoreceptor, etc.), or other image plane viewing or receiving medium.

Due to the similarity between the structure and operation of the embodiment of FIGS. 1 and 2 and the embodiment of FIG. 3, the remainder of the description of the present invention shall be with regard to a single beam embodiment (that shown in FIGS. 1 and 2) for clarity and simplicity. The discussion is, however, equally applicable to multiple beam apparatus, as will be appreciated by those skilled in the art. Furthermore, many of the details of the lenses and other optical and mechanical components of a complete ROS system may be omitted for clarity since they are well known in the art.

For purposes of the following explanation, it will be assumed that electro-optic device 22 takes the form of an isosceles triangular prism, as shown in the Figures. (The material composition of the device 22 is described in detail below.) Also, it will be appreciated that optimal results are achieved when the electro-optic device 22, in the case that it takes the form of a prism, is fully illuminated (i.e., fully filled with light). This is because the resolving power of the prism is inversely proportional to the width of the optical beam, which sets a lower limit on the height of the prism. However, to minimize input electrical power it is desirable to make the prism as small as possible. Hence fully illuminating the prism maximally utilizes its active area. However, it will be appreciated that electro-optic device 22 may take other forms such as a diffraction grating, thin film or similar element where appropriate.

Electro-optic device 22 facilitates the control of the spot position which forms a basis for the present invention. This control is based on the aspect of device 22 that its refractive index may be easily, quickly, and accurately varied. In particular, a class of such devices exists whose index of refraction may be varied by the application of an electrical bias to the device. For instance, the semiconductor AlGaAs exhibits this feature, as well documented in the art. In the embodiment shown in FIGS. 1 and 2, electro-optic device 22 is shown as a prism, which for the purposes of the following discussion shall be assumed to be AlGaAs, and which is shown in more detail in FIG. 4. However, device 22 may be another suitable material such as lithium niobate, liquid crystal, etc.

Figure 4:
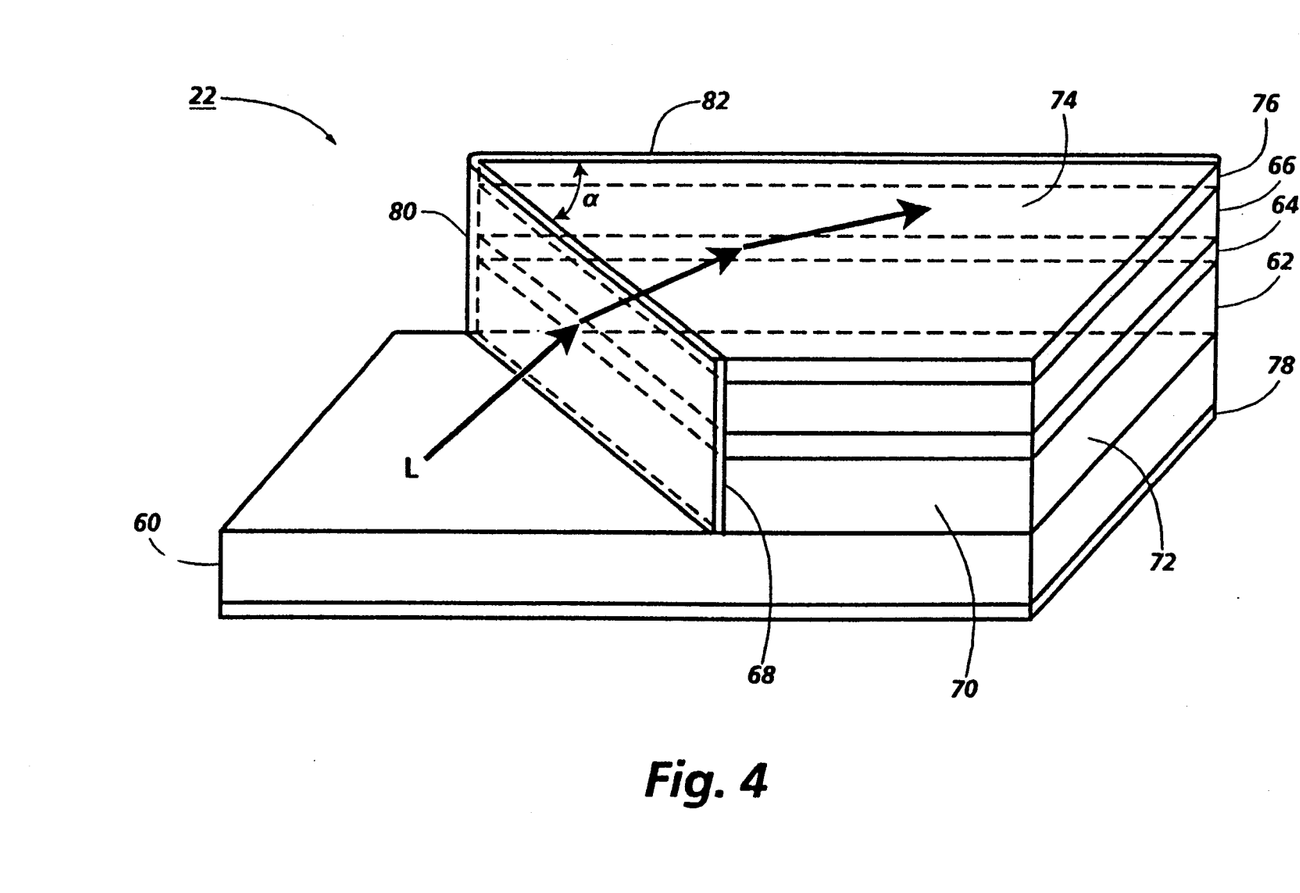
FIG. 4 shows in detail an electro-optic element which may be employed in the present invention to allow controllable spot registration in a ROS system.

Device 22 shown in FIG. 4 includes a substrate 60 having deposited thereon an n-$Al_yGa_{(1-y)}As$ cladding layer 62, where y might typically be equal to 0.40, for example by MOCVD methods well known in the art. A waveguide core 64 of $Al_xGa_{(1-x)}As$, where y > x and x might be 0.2, is next deposited on layer 62 (although waveguide core might also be a multiple quantum well structure, where appropriate). Waveguide core 64 is chosen to have a wide bandgap so that it is transparent at the wavelength of operation. A p-$Al_zGa_{(1-z)}As$ cladding layer 66, where z > x and z typically is equal to y, is then deposited on layer 64. The structure is then etched down to the substrate by methods known in the art to form etched facet 68. Then, three sides of the structure are cleaved to form cleaved facets 70, 72, and 74. Metallic electrical contacts 76 and 78 are next applied above layer 66 and below substrate 60, respectively. Anti-reflective (AR) coatings 80 and 82 are next applied to facets 68 and 74, respectively. A prism is thereby formed which serves to selectively diffract light incident thereupon as a function of the bias applied between the contacts 76 and 78. The path of the diffracted light is shown by way of the exemplary double arrow in FIG. 4 labeled L.

Figures 5, 5A:
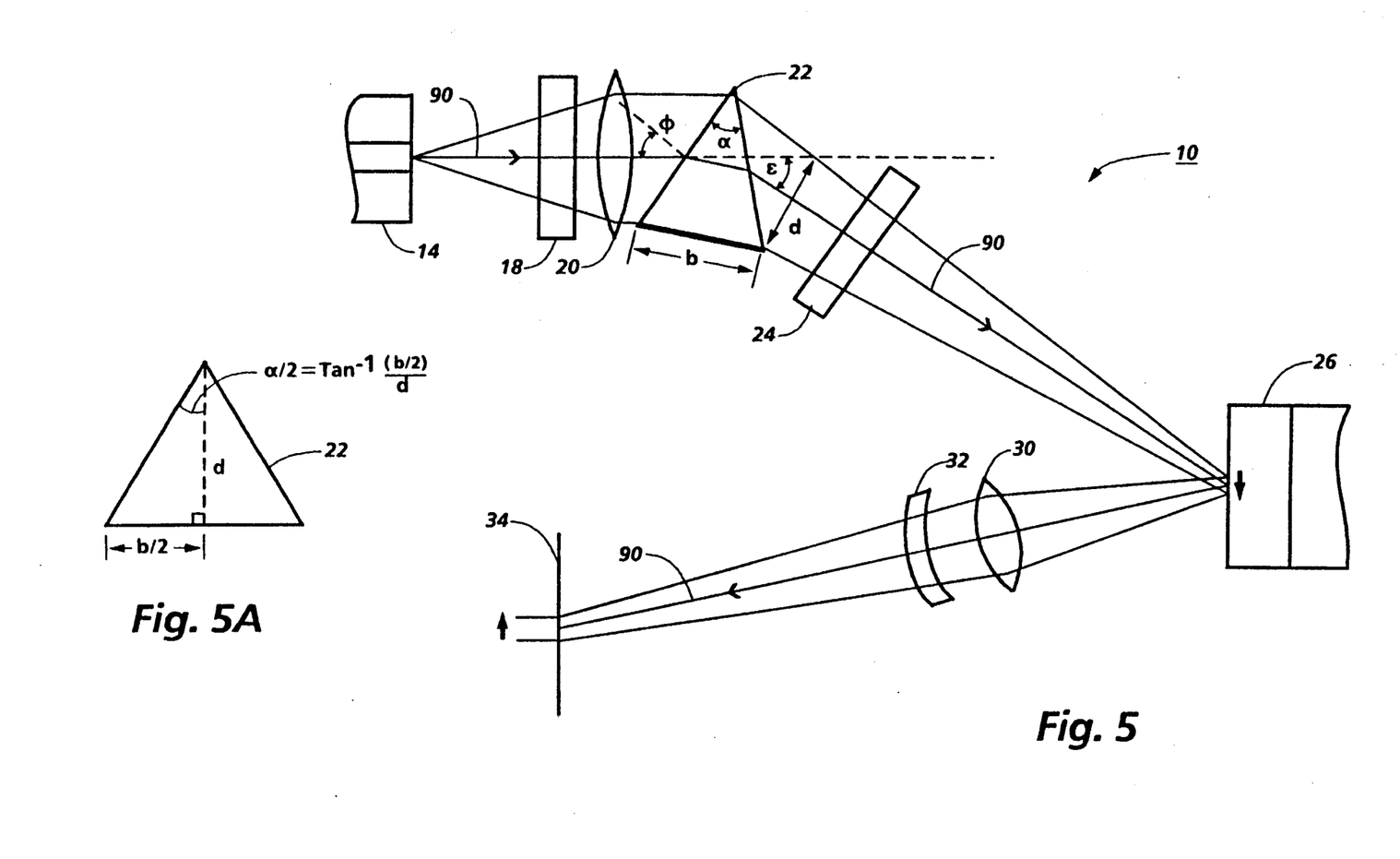
FIGS. 5 and 5A show a schematic representation of a ROS system for the purposes of describing the nature and extent of the control of spot position provided in the process scan direction by the present invention.

FIGS. 5 and 5a show a schematic representation of apparatus 10 for the purposes of describing the nature and extent of the control of spot position provided in the slow scan plane by the present invention. For the purposes of simplicity of explanation, only elements necessary to the explanation have been shown therein.

Rays of an optical beam from light source 14, as illustrated by a representative ray 90, will undergo an angular deviation $\epsilon$ upon refraction by electro-optic device 22. The extent of that refraction will vary as a function of the index of refraction of device 22. That is, if the index of refraction of device 22 is changed by an amount $\Delta n$, there will be a corresponding change in the angular deviation $\Delta\epsilon$. M. Born and E. Wolf show in *Principles of Optics* (5th ed. Pergamon Press, p. 180) that at minimum deviation, $\Delta\epsilon$ is given by $$\Delta\epsilon = \Delta n(b/d) \quad (1)$$

where b is the base of the prism and d is the width of the output beam.

To calculate the resolving power of the prism for a change in refractive index, referring again to Born and Wolf (p. 404, supra), the angular divergence required to define one spot is $\lambda/d$, where $\lambda$ is the wavelength of the light. Then to resolve two spots by changing the refractive index by $\Delta n$, $$\Delta\epsilon = \lambda/d \quad (2)$$

from which is obtained $$\Delta n = \lambda/b \quad (3)$$

Thus, the required index change can be achieved by increasing the base of the prism. By way of example, for a laser operating at 780 nm and a prism with b = 1 mm, $\Delta n = 0.78 \times 10^{-3}$, which is within reason for AlGaAs.

The physical principles yielding an adequate amount of index change in an AlGaAs prism may be either the linear or quadratic electro-optic effect or free carrier injection. For the linear electro-optic effect, the value $\Delta n = 0.2 \times 10^{-3}$ is consistent with the value calculated from the known electro-optic coefficient of GaAs ($1.6 \times 10^{-10}$ cm/V) and 15 volts dropped across a 2 $\mu$m layer. See, for example, I. P. Kaminow, IEEE J. Quant. Electron., vol. 4, p. 23 (1968)). It is also consistent with the value obtained by Houghton in Electronic Letters, vol. 20, p. 479 (1984) for $Al_{0.25}Ga_{0.75}As$ at 1.15 $\mu$m, and about half of the value obtained by Simes, et al., in Appl. Physics Letters, vol. 53, p. 637 (1988) for a multiple quantum well structure operated at 25 volts. Using this value, for two resolvable spots the prism base must be 3.9 mm.

A free carrier plasma will introduce a much stronger index change than the linear electro-optic effect described above. Thus, by properly forward biasing the prism, carriers may be injected into the waveguide core 64 (FIG. 4). The index change introduced by free carriers is approximately $$\Delta n = (-1.14 \times 10^{-21}) \times N \quad (4)$$

where N is the carrier density. Thus, a prism with a 1 mm base operating at 780 nm requires $$N = \lambda/(b \times 1.14 \times 10^{-21}) = 6.8 \times 10^{17}/cm^3 \quad (5)$$

This level of carrier injection will not introduce significant beam attenuation or additional spontaneous emission.

The angle of the prism $\alpha$ is determined by the width of the output beam d and the prism base b from the following relation $$\sin^2 \alpha/2 = b^2/(4d^2 + b^2 n^2) \quad (6)$$

Since the index change required for a given number of resolved spots depends only on $\lambda$ and b, we fix b and tradeoff beam width for prism angle. Table 1 indicates possible values for an $Al_{0.2}Ga_{0.3}As$ waveguide core, with n=3.58, and prism base b=1 mm.

TABLE 1

| Beam width d (mm) | prism angle $\alpha$ (degrees) | angle of incidence $\phi$ (degrees) | prism height (mm) |
|---|---|---|---|
| 0 | 32.4 | 87.2 | 1.72 |
| 0.5 | 31.2 | 74.3 | 1.79 |
| 1.0 | 28.2 | 60.7 | 2.00 |
| 2.0 | 21.5 | 41.9 | 2.63 |
| 3.0 | 16.5 | 30.9 | 3.45 |
| 4.0 | 13.1 | 24.1 | 4.35 |

Waveguide core 64 is of the type that allows propagation of a lightwave therethrough while confining it in at least one dimension to the order of one wavelength. The lightwave propagates, without diverging, in the longitudinal direction of the guide since it is confined to the waveguide core by the lower refractive index of the cladding layers. Confinement of the optical field of the lightwave to a thin waveguide core is advantageous when using the electro-optic effect employed by the apparatus of the present invention since the change in the refractive index which the lightwave experiences has the maximum effect on the lightwave's propagation speed. Furthermore, in general, the electric field required to produce an adequate change in the refractive index is quite high. Since the electric field in the waveguide core is given by the applied voltage divided by the physical thickness of the core layer, a thin core such as may be employed in the above described structure allows a high electric field and hence large change in the refractive index. As described, 75 kV/cm (15 volts/2 $\mu m$) is required in GaAs to produce $\Delta n = 0.2 \times 10^{-3}$. If the wave could be confined to 1 $\mu m$, instead of 2 $\mu m$, then either the same $\Delta n$ ($0.2 \times 10^{-3}$) can be produced by half the voltage (7.5 volts), or $\Delta n$ may be doubled ($0.4 \times 10^{-3}$) for the same voltage (15 volts).

Figure 6:
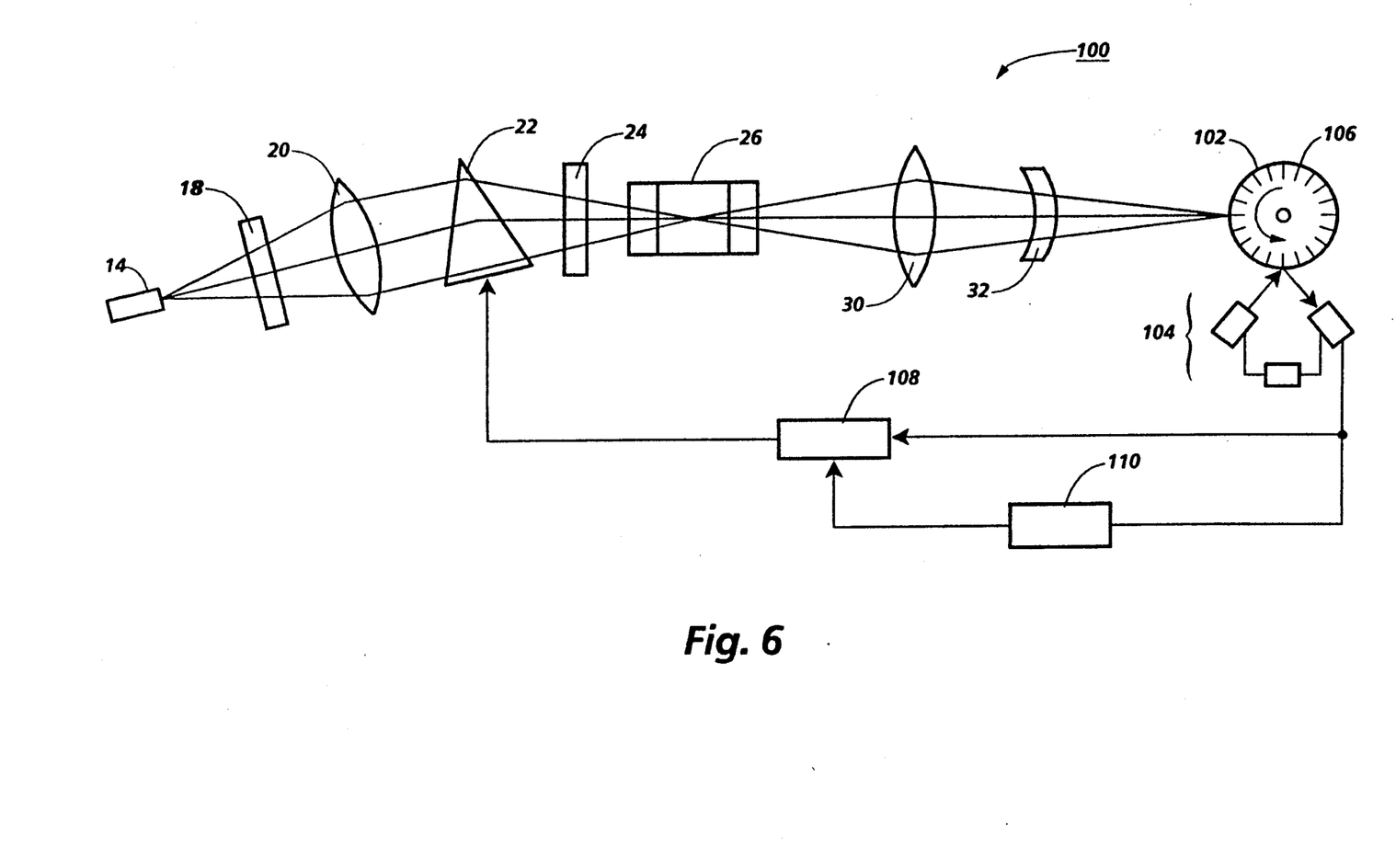
FIG. 6 shows a side or elevation view of the general optical configuration of an apparatus according to the first embodiment of the present invention, showing a means for detecting errors in the position of the photoreceptive drum and feeding a measure of the detected error and predetermined correction data back to the electro-optic element as a control signal for adjusting the position of the laser beam emerging from the electro-optic element.

The method of the present invention may utilize either feedback control for "on the fly" correction or control from stored data, or both, to move the spot in the process scan direction to accommodate for motion quality errors, and the like, as detailed below. Initially, however, those errors must be detected. The arrangement 100 of FIG. 6 shows a simple method for determining the rotational error of a photoreceptive drum 102 by way of a synchronized strobe and sensor arrangement 104 utilizing timing marks 106 on drum 102. Arrangement 100 includes processing which enables determination of the existence and extent of rotational error, and generation of a control signal in response to the determination of the extent of error which is transmitted to control apparatus 108 controlling the bias applied to the electro-optic element 22.

The bias for the electro-optic device 22 is supplied by a voltage source (not shown). Based on the data of Houghton in Electronics Letters, vol. 20, p. 479 (1984) for a double heterostructure material, and Simes, et al. in Applied Physics Letters, vol. 53, 637 (1988) for multiple quantum well material, an operating voltage of 25 volts or less would be required. For carrier injection devices, the operating voltage would be less than 5 volts and the operating current for a prism with a 1 mm base would be less than 1 amp depending on the carrier lifetime of the material.

In addition to the above, spot position may be controlled by predetermined correction data, which is feasible for certain recurrent errors such as off axis rotation of a photoreceptive drum, surface distortion of a display screen, etc., and provision of this predetermined correction to the apparatus controlling the bias applied to the electro-optic element 22 from a processor controlled memory device 110 or the like. The output of the processor controlled memory device 110 could be synchronized by the strobe and sensor apparatus 104, or other suitable synchronization arrangement.

Figure 7:
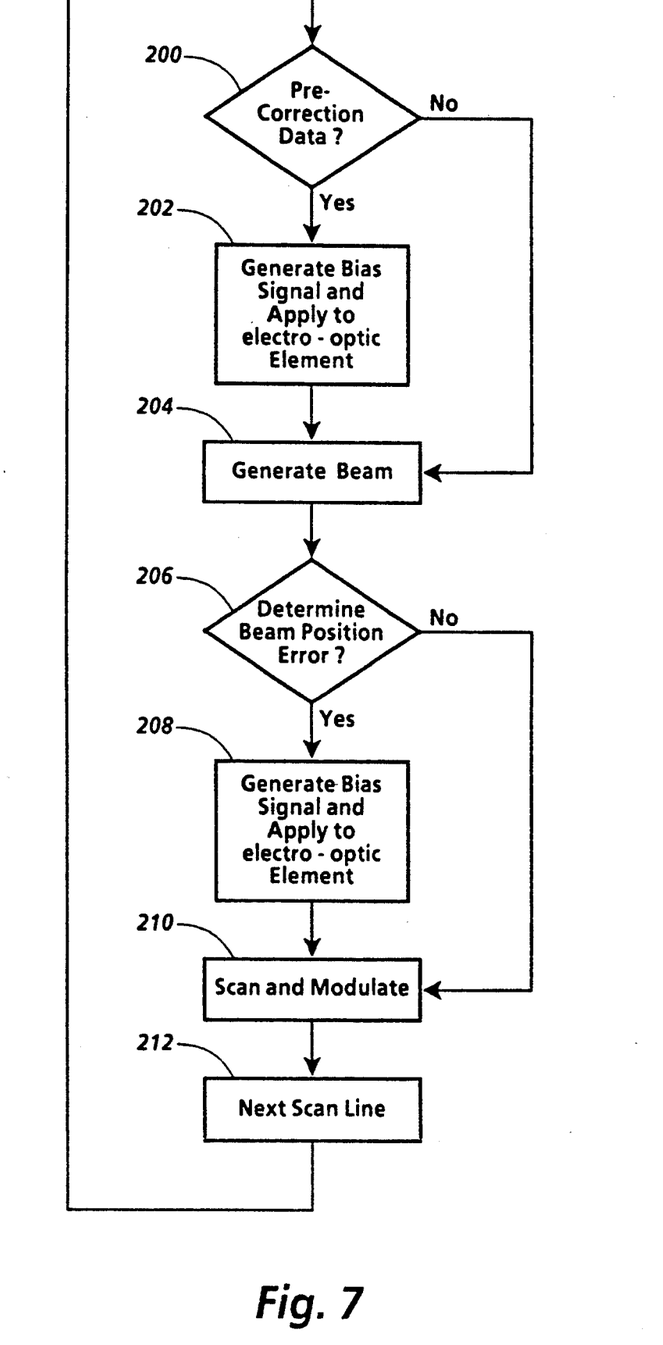
FIG. 7 is a flow diagram of one embodiment of the present invention for determining and correcting for slow scan direction errors on the fly, and for compensating for predetermined slow scan direction spot position errors.

FIG. 7 details one complete cycle of operation of the method of the present invention for correcting for slow scan direction errors. It will be assumed that any predetermination of required correction for recurrent errors has been made, and that the correction data has been stored in an appropriate memory device (not shown). To begin, means (not shown) are employed to determine whether the current scan line is one for which predetermined correction data has been stored. This is shown at step 200. If such data exists, the data is converted into a bias signal which is applied to the electro-optic element in order to correct for predetermined spot position error, as shown at 202. Once the correction for predetermined errors has been made, or if no such predetermined error data exists, the light beam is generated at 204. Next, the position that the beam is incident on the image plane is determined at 206 (alternatively, error in photoreceptor motion or position correctable by selective spot positioning is determined). If there is slow scan direction position error at this point, the extent of that error is determined by appropriate determining apparatus, for example by the aforementioned strobe and sensor arrangement. The extent of that error is converted to an appropriate electrical bias signal which is communicated to the electro-optic element at 208 in order to correct, on the fly, for the determined error. Once the correction for this error has been made, or if it is determined that no such error exists, the beam may then be scanned and modulated in order to write the scan line at 210. When the end of scan is detected, a call is made for the next scan line data at 212, the scan processes in the slow scan direction and the process begins again at 200.

It will be apparent that, depending on the operating parameters of the optical output apparatus embodying the present invention, spot position control may be achieved on a pixel-by-pixel basis. For example, consider a relatively high performance laser xerographic printing apparatus with typical operating parameters of 60 page per minute output, 600×600 spot per inch resolution, and 14 inch scan. For this device, a typical pixel exposure time is on the order of 14 nanoseconds. Proper selection of materials and geometry for the electro-optic element of the present invention will allows switching speeds of 14 nanoseconds or faster, thus facilitating mid-line, pixel-by-pixel spot position correction.

By incorporating the above described spot position control methodology with the appropriate apparatus for xerographic printing, including, for example, a photoreceptor belt or drum means for moving the photoreceptor, means for charging the photoreceptor, means for forming a latent image on the photoreceptor, means for transferring the latent image to paper, means for erasing the latent image from the photoreceptor and for cleaning the photoreceptor, paper transport means, and means for fusing the image onto the paper, a complete xerographic print engine may be produced. Details of the structure and operation of printer devices in general are beyond the scope of the present disclosure, however they are well known to those skilled in the art. It will be appreciated from the above description, though, that the present invention is particularly well suited for inclusion in those printing applications employing ROS as a portion of the printing process, as well as other printing applications.

Figure 8:
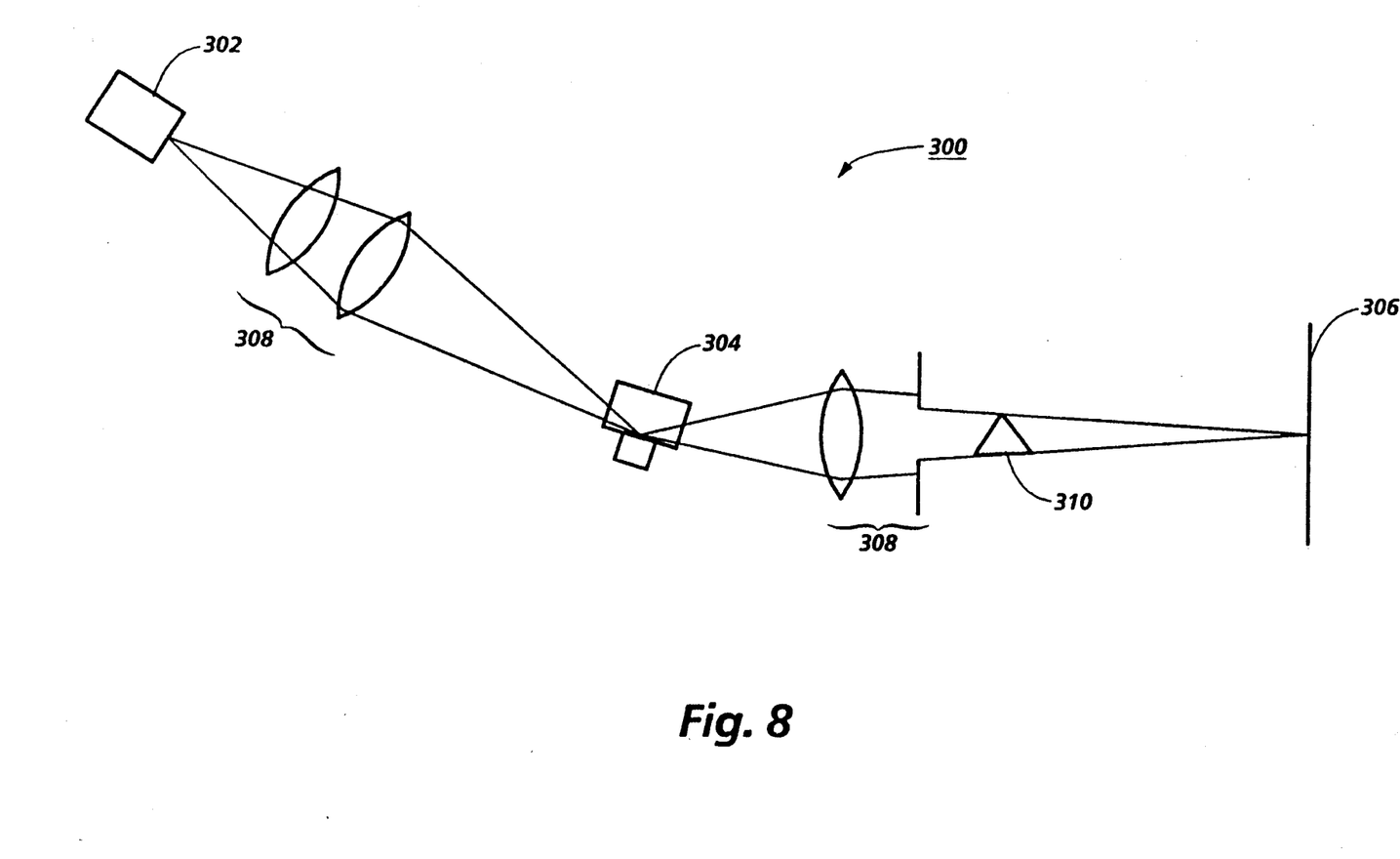
FIG. 8 is a side or elevation view of a non-scanning embodiment of the present invention.

In the above discussion it has been assumed that the scanning device (e.g., 26 of FIG. 1) is a rotating polygon having at least one reflective facet (e.g., 28 of FIG. 1). However, certain embodiments of the present invention obviate the need for a scanning device. For example, in the embodiment 300 shown in FIG. 8, rather than scanning a beam across the image plane, a line-width beam from source 302 is pixel-by-pixel modulated by a modulator 304 and projected to an image plane 306 by appropriate optics 308. The basic configuration of this embodiment is similar to that shown and described in U.S. Pat. No. 4,638,334 to Burnham et al., dated Jan. 20, 1987, so that details of the workings of the modulator and related elements are beyond the scope of this disclosure. However, in addition to the modulator and related elements, the embodiment of FIG. 8 includes the appropriate apparatus 310, such as the aforementioned electro-optic semiconductor prism, to facilitate line position (as opposed to spot position) control in the slow scan direction on the image plane.

Described above are embodiments employing two distinct methods of modulation—direct modulation of the light source and modulation by way of total internal reflection and a zero stop. Other modulation schemes may, however, be employed without departing from the spirit and scope of the present invention. For example, another method of modulating beam 16 would be to project it either onto or through a modulator device (not shown), such as an electro-optic or acousto-optic modulator, etc. Placement of the modulator device along the beam path will depend upon its type, the configuration of apparatus 10, etc., as will be appreciated by one skilled in the art.

In general, to those skilled in the art to which this invention relates, many changes in construction and widely differing embodiments and applications of the present invention will suggest themselves without departing from its spirit and scope. For example, the present invention operates equally well, and without significant modification, to control spot position in a single beam ROS or, en bloc, spot positions in a multiple beam ROS. Furthermore, it is possible to fold the optics of a ROS apparatus incorporating the present invention, and thereby compact the apparatus, by employing a reflective or transmissive/reflective body, as opposed to the aforementioned purely transmissive body, as the electro-optic element. Further still, the apparatus and method of the present invention may be combined with other apparatus and/or methods of controlling spot position to achieve advantageous results. For example, the inventions of U.S. Pat. Nos. 5,204,523 and 5,208,456 may be employed herewith such that bow correction may be accomplished on individual spots by those inventions, while all spots emitted from a multiple laser array are selectively positioned by the present invention to correct for motion quality errors. Thus, the disclosures and descriptions herein are illustrative, and are not intended to be in any sense limiting.

What is claimed is:

1. An improved raster output scanning apparatus of the type including a light source for emitting a light beam, means for modulating the light beam in accordance with a data signal, means for scanning the light beam in a fast scan direction, means for scanning the light beam in a slow scan direction orthogonal to the fast scan direction, and image plane means for receiving the scanned light beam, the improvement comprising:

electro-optic means for controlling the slow scan direction position of the light beam at the point that it is incident upon the image plane means, disposed in the optical path between the light source and the image plane means, and composed of an at least semitransparent material whose index of refraction varies as a function of a bias applied thereto to thereby control the slow scan direction position of the light beam.

2. The improved raster output scanning apparatus of claim 1, further including electrical bias application means for applying a bias to the electro-optic means to thereby controllably vary the index of refraction of the electro-optic means.

3. The improved raster output scanning apparatus of claim 1, wherein said electro-optic means comprises a prism.

4. The improved raster output scanning apparatus of claim 1, wherein said electro-optic means comprises a prism of semiconducting material.

5. The improved raster output scanning apparatus of claim 4, wherein said semiconducting material is $Al_x Ga_{(1-x)}As$, where $0 \leq x \leq 1$.

6. The improved raster output scanning apparatus of claim 1, wherein said image plane means comprises a photoreceptor.

7. The improved raster output scanning apparatus of claim 1, wherein said image plane means comprises photographic film.

8. The improved raster output scanning apparatus of claim 1, further comprising position detection means communicationally connected to the electro-optic means, said position detection means for detecting the position of the light beam in the image plane means in the slow scan direction, and for communicating the position to the electro-optic means, and further wherein the electro-optic means is responsive to the position communication from the detection means to thereby facilitate control of the slow scan direction position that the light beam is incident upon the image plane means.

9. The improved raster output scanning apparatus of claim 2, further comprising position detection means for detecting the position of the light beam in the image plane means in the slow scan direction, communicationally connected to a bias control means wherein the detected position and a desired position are compared and a control signal issued from the bias control means to the bias application means to thereby facilitate control of the slow scan direction position that the light beam is incident upon the image plane means.

10. The improved raster output scanning apparatus of claim 1, further comprising position error detection means communicationally connected to the electro-optic means, said position error detection means for detecting the presence and extent of slow scan direction position errors of the light beam, and for communicating the presence and extent of such errors to the electro-optic means, and further wherein the electro-optic means is responsive to error presence and extent communication from the detection means to thereby correct the slow scan direction position of the light beam for slow scan direction position errors.

11. The improved raster output scanning apparatus of claim 2, further comprising position error detection means for detecting the presence and extent of slow scan direction position errors of the light beam, said position error detection means being communicationally connected to a bias control means wherein the presence and extent of slow scan direction position errors of the light beam are converted into a control signal which is communicated to the bias application means to thereby correct the slow scan direction position of the light beam for slow scan direction position errors.

12. The improved raster output scanning apparatus of claim 1, further comprising position error memory means communicationally connected to the electro-optic means, having stored therein slow scan direction position correction data for communication to the electro-optic means, and further wherein the electro-optic means is responsive to the correction data communication from the memory means to thereby correct the slow scan direction position of the light beam for slow scan direction position errors.

13. The improved raster output scanning apparatus of claim 2, further comprising position error memory means having stored therein slow scan direction position correction data for communication to the bias application means to thereby correct the slow scan direction position of the light beam for slow scan direction position errors.

14. The improved raster output scanning apparatus of claim 13, further including synchronization means for applying the slow scan direction position correction data to the bias application means in synchronization with the scanning of the light beam.

15. The improved raster output scanning apparatus of claim 10, further comprising position error memory means communicationally connected to the electro-optic means, said position error memory means having stored therein slow scan direction position correction data for communication to the electro-optic means, and further wherein the electro-optic means is responsive to both the slow scan direction position errors of the light beam from the detection means and to the correction data from the position error memory means to thereby correct the slow scan direction position of the light beam for slow scan direction position errors.

16. The improved raster output scanning apparatus of claim 11, further comprising position error memory means having stored therein slow scan direction position correction data for communication to the bias application means, and further wherein the bias application means is responsive to both the slow scan direction position errors of the light beam from the detection means and to the slow scan correction data from the position error memory means to thereby correct the slow scan direction position of the light beam for slow scan direction position errors.

17. A laser printer of the type which forms an image on a medium in response to an image data signal, comprising:
a light source for generating a light beam;
modulating means for modulating the light beam generated by said light source in response to said image data signal;
scanning means for scanning the light beam produced by said light source and modulated by said modulating means in a raster fashion;
a photoreceptive element for receiving the modulated and scanned light beam, and upon which an image having a fast scan and a slow scan position is formed by the modulated and scanned light beam;
focusing means for focussing the light beam to a spot on the photoreceptive element; and
electro-optic means for controlling the slow scan direction position of the light beam upon the photoreceptive element, said electro-optic means being disposed between the light source and the photoreceptive element, and of an at least semitransparent material whose index of refraction varies as a function of a bias applied thereto to thereby control the slow scan direction position of the light beam.

18. The laser printer of claim 17, further comprising beam position error detecting means for detecting slow scan direction positional errors of the beam at said photoreceptive means, and for providing an error correction signal in response to a detected positional error, and further wherein the electro-optic means is responsive to an error correction signal to thereby correct the slow scan direction position of the light beam for slow scan direction position errors.

19. The laser printer of claim 17, further comprising position error memory means communicationally connected to the electro-optic means, the error memory means having stored therein slow scan direction position correction data for communication to the electro-optic means, and further wherein the electro-optic means is responsive to the correction data communication from the memory means to thereby correct the slow scan direction position of the light beam for slow scan direction position errors.

20. The laser printer of claim 17, wherein the electro-optic means comprises a semitransparent semiconductor prism.

21. An optical device having a light source and which produces and controls the slow scan position of a spot in an image plane, said optical device comprising:
electro-optic means for controlling said slow scan position of said spot, said electro-optic means disposed between said light source and said image plane and including an at least semitransparent material whose index of refraction varies as a function of a bias applied thereto to thereby control said slow scan position of said spot.

22. The apparatus of claim 21, wherein said electro-optic means includes a prism.

23. The apparatus of claim 22, wherein said prism includes a semiconducting material.

24. The apparatus of claim 22, wherein said semiconducting material is AlGaAs.

25. The apparatus of claim 21, further including electrical bias application means for applying a bias to said electro-optic means to thereby controllably vary the index of refraction of said electro-optic means.

26. The apparatus of claim 25, further comprising position detection means for detecting said slow scan position of said spot in said image plane, said position detection means being communicationally connected to said electrical bias application means wherein said detected position and a desired position are compared and a control signal is issued from said electrical bias application means to control said slow scan position of said spot.

* * * * *